United States Patent

Johnson et al.

[15] 3,660,144

[45] May 2, 1972

[54] UNSATURATED ACRYLIC RUBBER AND VINYL MONOMER PAINT

[72] Inventors: Olin B. Johnson, Livonia; Santokh S. Labana, Dearborn Heights, both of Mich.

[73] Assignee: Ford Motor Company, Dearborn, Mich.

[22] Filed: Dec. 21, 1970

[21] Appl. No.: 100,478

[52] U.S. Cl............................117/93.31, 260/836, 260/881, 260/885, 260/886
[51] Int. Cl......................................C08g 45/04, C08f 15/00
[58] Field of Search...........................................260/836, 885

[56] References Cited

UNITED STATES PATENTS

| | | | |
|---|---|---|---|
| 3,423,481 | 1/1969 | Mizutani | 260/836 |
| 3,437,514 | 4/1969 | Burlant | 117/93.31 |
| 3,450,796 | 6/1969 | Griffin | 260/885 |
| 3,502,745 | 3/1970 | Minton | 260/881 |
| 3,528,844 | 9/1970 | Burlant | 260/881 |

Primary Examiner—Paul Lieberman
Attorney—John R. Faulkner and Olin B. Johnson

[57] ABSTRACT

A radiation-curable paint which on a pigment and particulate filler-free basis consists essentially of vinyl monomers and an alpha-beta olefinically unsaturated, elastomeric particle of crosslinked acrylic polymer. The coating is applied as a film-forming dispersion to the surface of a substrate and cured thereon by ionizing radiation, e.g., an electron beam. This application is further directed to articles of manufacture coated with this paint using this process of curing.

12 Claims, No Drawings

UNSATURATED ACRYLIC RUBBER AND VINYL MONOMER PAINT

A radiation-curable coating material of unique characteristics is provided by homogeneously dispersing about 10 to about 70 parts by weight of alpha-beta olefinically unsaturated, elastomeric, particles of crosslinked acrylic polymer within about 90 to about 30 parts by weight vinyl monomers. The dispersion is applied as a paint film to substrates of wood, metal, glass, and polymeric solid and cured thereon by ionizing radiation, preferably and electron beam having average energy in the range of about 100,000 to about 500,000 electron volts. This invention is further directed to the coated articles of manufacture prepared from this coating material by this process. The film-forming constituents of the dispersion are hereinafter described in greater detail.

I. Preparation Of The Acrylic Rubber Particles

The acrylic rubber particle is a cross linked, elastomeric, acrylic polymer having alpha-beta olefinic-unsaturation surface functionality. These particles are preferably prepared by first preparing rubber particles having epoxy functionality and subsequently reacting the epoxide groups with an alpha-beta olefinically unsaturated monocarboxylic acid, e.g. acrylic acid, methacrylic acid, etc. It is also possible to produce such materials by reversing the process, i.e. incorporating the acrylic acid in the rubber particles and reacting the carboxyl groups with an epoxy acrylate, but this is more difficult and less satisfactory.

These particles can be prepared in either an aqueous or organic medium.

In a preferred method of preparation, a major amount of monoacrylate is emulsion copolymerized with a crosslinking amount of a di- or tri- functional monomer containing two or more nonconjugated terminal ethylenic groups, preferably a diacrylate using a water-soluble free radical initiator and a suitable surfactant to yield a latex of relatively uniform particle size, e.g., 0.04 to 1 micron average diameter.

The monoacrylate component of the monomer mixture comprises about 80 to about 98 mole percent of the mixture while the balance, the di- or tri- functional component constitutes about 2 to about 20 mole percent. The monoacrylate component contains about 65 to about 98, preferably about 70 to about 95, mole percent of a monofunctional, alkyl methacrylate and about 2 to about 35, preferably about 5 to about 30 mole percent of an epoxy acrylate, e.g., glycidyl acrylate, glycidyl methacrylate, etc. The monofunctional, alkyl acrylate is preferably an ester of a $C_2 - C_8$ monohydric alcohol and acrylic acid, e.g., ethyl acrylate, butyl acrylate, hexyl acrylate, 2-ethyl hexyl acrylate and/or mixtures of the same. Certain other alkyl acrylates or methacrylates may be used when a crosslinked polymer thereof has an appropriate glass transition temperature, e.g., dodecyl acrylate or lauryl methacrylate. Butyl acrylate and 2-ethyl hexyl acrylate are the most preferred of the monofunctional monoacrylates for use in forming this rubber. The glass transition temperature of the crosslinked polymer should be such that the particle retains its rubber-like properties at temperatures to which the paint would normally be exposed. Within this limitation, any suitable mixture of alkyl acrylate and alkyl methacrylate monomers may be used.

Suitable crosslinking agents include, but not by way of limitation, 1,3-butylene diacrylate, 1,3-butylene dimethacrylate, divinyl benzene, 1,6-hexamethylene diacrylate, 1,6-hexamethylene dimethacrylate, 1,1,1-trimethylolethane triacrylate, 1,1,1-trimethylolethane trimethacrylate, 1,1,1-trimethylolpropane triacrylate, 1,1,1-trimethylolpropane trimethacrylate, 1,4-dimethylolcyclohexane dimethacrylate, allyl acrylate, allyl methacrylate, methallyl acrylate, methallyl methacrylate, diallyl maleate, diallyl fumarate and diallyl phthalate. In one embodiment, the crosslinking agent is a diester of acrylic or methacrylic acid and a $C_2-C_8$, preferably a $C_2-C_{6a}$, dihydric alcohol. In another embodiment, the crosslinking agent is a triester of acrylic or methacrylic acid and a $C_2-C_{8a}$, preferably a $C_2-C_6$ trihydric alcohol.

The polymerization process is continued to yield a stable latex of relatively uniform particle size and composition. The latex is coagulated, washed, and dried to yield a finely divided powder. This powder is dispersed in a suitable solvent, e.g., benzene, styrene, methyl methacrylate, etc., and the epoxy groups resulting from the incorporation of the epoxy acrylate are reacted with an alpha-beta olefinically unsaturated monocarboxylic acid by techniques known to the art. If the solvent is unsuitable for use as the vinyl monomer component of the paint, or a part thereof, it can be removed after this reaction has been carried out and the particles redispersed in the vinyl monomers to be used. If the solvent is suitable for use in the paint, they may later serve as the vinyl monomer component or as a part thereof.

The monomer charge is emulsified by 1 or more micelleforming compounds composed of a hydrophobic part, such as a hydrocarbon group containing eight or more carbon atoms, and a hydrophilic part, such as alkali metal or ammonium hydroxide groups, phosphate or sulfate partial ester groups, sulfonate groups, and the like. Exemplary emulsifying agents include alkali metal sulfonates of styrene, naphthalene, decyl benzene and dodecyl benzene; sodium dodecyl sulfate, sodium stearate; sodium oleate; the sodium alkyl aryl sulfonate; polyoxymethylene sulfates and phosphates; the ethylene oxide condensates with long chain fatty acids, alcohols, and mercaptans and the alkali metal salts of rosin acids. These materials and the techniques of their employment in emulsion formation and maintenance are well known to the art and have no unusual application here. As they are conventional materials employed in a conventional manner, further description and explanation is unnecessary.

The polymerization initiator is composed of one or more water-soluble, free-radical-generating species such as hydrogen peroxide or sodium, potassium, or ammonium persulfates, perborates, peracetates, percarbonates and the like. As is well known in the art, these initiators may be associated with activating systems such as redox systems which may incorporate mild reducing agents such as sulfites and thiosulfites and redox reaction promotors such as transition metal ions.

A chain transfer agent or a mixture of chain transfer agents may be added to the reaction medium to limit the molecular weight of the crosslinked acrylic polymers. Such chain transfer agents are generally mercaptans such as dodecane thiol, benzene thiol, pentane thiol, and butane thiol.

Those skilled in the art will be aware that other emulsifying agents, polymerization initiators and chain transfer agents may be used when compatible with the polymerization system herein employed. The reaction may be carried out at a temperature of about 40° C. to about 80° C., or at lower temperatures, as from 0° C. to 80° C. in the case of activated systems.

The epoxy-functional particles may also be prepared in an aliphatic hydrocarbon medium.

II. Vinyl Monomers Employed In The Paint Dispersion

The Vinyl dispersion advantageously contains about 30 to about 90, weight percent vinyl monomers and about 10 to about 70, preferably about 25 to about 75, weight percent of the acrylic rubber particles.

Monomer type and concentration provides one means for adjusting the viscosity of the paint dispersion to conform to the methods of application desired, e.g., spray coating, roll coating, etc. In functional terms, the amount of vinyl monomer present is at least sufficient to convert the alpha-beta olefinically unsaturated, elastomeric, particles of crosslinked acrylic polymer into a crosslinked continuous coating on the surface of a substrate when a film of such coating dispersion is applied thereto and exposed to ionizing radiation, e.g., an electron beam.

Vinyl monomers employed may be monofunctional monoacrylates, especially esters of acrylic or methacrylic acid and a $C_1-C_8$, preferably a $C_1-C_6$ monohydric alcohol, e.g., methyl methacrylate, ethyl acrylate, butyl acrylate, butyl methacrylate, 2-ethyl hexyl acrylate, etc. The monomer mixture may also include a minor amount, e.g., 1 to 30 mole percent of diacrylates, e.g., the diesters of acrylic or methacrylic acid and a $C_2-C_6$ diol such as 1,3-butylene diacrylate, 1,3-butylene dimethacrylate, 1,6-hexamethylene diacrylate, 1,6-hexamethylene dimethacrylate, ethylene glycol dimethacrylate, etc.

Monovinyl hydrocarbons, e.g., styrene, alpha methyl styrene, vinyl toluene, etc., may also be used either alone or in combination with the aforementioned monoacrylates. Minor amounts, e.g., about 1 to about 30 mole percent of the vinyl monomer mixture may be made up of divinyl hydrocarbons such as divinyl benzene. Other vinyl monomers, e.g., acrylonitrile, methacrylonitrile, vinyl acetate, etc., may be employed in minor amounts, e.g., about 1 to about 30 mole percent.

Advantageously, at least 70 weight percent of the vinyl monomer component is made up of monoacrylates selected from esters of $C_1-C_8$ monohydric alcohols and acrylic or methacrylic acid and/or monovinyl hydrocarbons having about eight to about nine carbon atoms. Frequently, it is advantageous to use a mixture of about 40 to about 60 mole percent of these monoacrylates and about 60 to about 40 mole percent of these monovinyl hydrocarbons.

III. Preparation And Application Of The Coating Dispersion To A Substrate

By adjusting the viscosity of the coating dispersion to a viscosity compatible with the desired method of coating, these coatings may be applied by any of the conventional methods, e.g., brushing, spraying, roll coating, curtain coating, flow coating, etc.

The viscosity may be regulated by varying the relative concentration of the acrylic rubber particles with respect to the vinyl monomer component and/or by varying the relative concentration of dissimilar monomers within the vinyl monomer component. The binder solution may be applied to the substrate essentially free of non-polymerizable organic solvents and/or diluents or it may be applied with the solvents and/or diluents in a method of application.

The coatings may be applied to any substrate, e.g., metal, wood, glass, shaped polymeric solids, etc. These coatings will ordinarily be applied to an average depth in the range of about 0.1 to about 4 mils, more commonly about 0.5 to about 2 mils.

IV. Curing The Coatings

Films formed of the paints of this invention can be cured with ionizing radiation at relatively low temperatures, e.g., room temperature (20° -25° C.) or a temperature between room temperature and that temperature at which significant vaporization of its most volatile component is initiated, ordinarily between 20° and 75° C. The radiation energy is applied at dosage rates of about 0.1 to about 100 Mrad per second on a workpiece, preferably a moving workpiece, with the coating receiving a total dose in the range of about 1 to about 25, commonly about 8 to 15 Mrad.

The term "ionizing radiation" as employed herein means radiation having sufficient energy to remove an electron from a gas atom, forming an ion, preferably radiation with minimum energy of, or equivalent to, at least about 5,000 electron volts except when the curing is carried out in vacuum. The preferred method of curing films of the instant paint binder on the substrate to which they have been applied is by subjecting such films to a beam of polymerization-effecting electrons which at its source of emission is within the range of, or equivalent to, about 100,000 to about 500,000 electron volts. If irradiation is carried out in vacuum or a reduced pressure, this energy may be much lower. In this method of curing, it is preferred to employ a minimum of about 25,000 volts per inch of distance between the radiation emitter and the workpiece when intervening space is occupied by air or other gas of comparable density. Adjustment is made for the relative resistance of the intervening gas which is preferably an oxygen-free inert gas such as nitrogen or helium.

In this application, the term "paint" is meant to include finely ground pigment and/or filler in the binder, the binder without pigment and/or filler or having very little of the same, which can be tinted if desired. Thus, the binder which is ultimately converted to a durable film resistant to wear, weather, etc., can be all or virtually all that is used to form the film or it can be a vehicle for pigmentary and/or mineral filler material.

The abbreviation "Mrad" as employed herein means 1 million rad. The term "rad" as employed herein means that dose of radiation which results in the absorption of 100 ergs of energy per gram of absorber, i.e., coating film. The electron emitting means may be a linear electron accelerator capable of producing a direct current potential in the range hereinbefore mentioned. In such device, electrons are ordinarily emitted from a hot filament and accelerated through a uniform voltage gradient. The electron beam, which may be about 1/8 inch in diameter at this point, is then scanned in one direction to make a fan-shaped beam and then passed through a metal window, e.g., aluminum, aluminum-copper alloy, or magnesium-thorium alloy of about 0.003 inch thickness.

This invention will be more fully understood from the following illustrative examples:

EXAMPLE 1

A radiation-curable paint is prepared in the following manner: To 1,000 parts by weight water which has been boiled and cooled to room temperature under a nitrogen atmosphere are added 2.86 parts by weight sodium dodecyl sulfate dissolved in 35.7 parts by weight water and about 1/9 of a monomer mixture consisting of 521 parts butyl acrylate and 48.5 parts by weight 1,3-butylene dimethacrylate. This mixture is stirred to establish dispersion of the monomers and 3.14 parts by weight potassium persulfate dissolved in 71.4 parts by weight water are added to the stirred mixture. This mixture is heated to 45° C. After about 10 minutes, addition of the remainder of this monomer mixture is begun at a rate such that the temperature of the reaction mixture is maintained at 47° to 50° C. During the addition of the last two-thirds of the monomer mixture, 5.72 parts by weight sodium sulfate dissolved in 35.7 parts by weight water are added at a substantially constant rate. During the addition of the last one-third of the monomer mixture there are added 72 parts by weight glycidyl methacrylate. The reaction mixture is maintained at 47° to 50° C. for about 2 hours.

The emulsion is then coagulated by addition of about 20 grams of concentrated hydrochloric acid solution and 100 ml of water. The rubber particles are isolated by filtration and washed with methanol containing 1 weight percent of hydrochloric acid. The particles are then dried to yield Powder A.

Twenty parts by weight of Powder A are dispersed in 200 parts by weight unpurified commercial styrene monomer. To this dispersion is added methacrylic acid in an amount providing about one carboxyl group per each epoxy group in the outer shells of the rubber particles and a catalytic amount (0.1 parts by weight based on methacrylic acid) benzyl triethyl ammonium chloride. The dispersion is heated until the reaction between the methacrylic acid and the epoxy groups on the graded elastomeric particles is at least 50% complete.

The styrene and unreacted methacrylic acid, if any, are removed from the dispersion by vacuum distillation.

The resultant particles are divided into five equal parts by weight. Dispersion A is formed by thoroughly mixing one part by weight of the particles with 4 parts by weight of methyl methacrylate. Dispersion B is formed by thoroughly mixing one part by weight of the particles with 6 parts by weight of methyl methacrylate. Dispersion C is formed by thoroughly mixing one part by weight of the particles with ten parts by weight of methyl methacrylate. Dispersion D is formed by thoroughly mixing one part by weight of the particles with 12 parts by weight of methyl methacrylate. Dispersion E is formed by thoroughly mixing one part by weight of the particles with four parts by weight of methyl methacrylate and 4 parts by weight of hydroxy ethylacrylate.

The dispersions A through E inclusive are separately applied as paint films to substrates and cured thereon by ionizing radiation provided by an electron beam. Each of the dispersions are applied to a variety of substrates, i.e., wood, steel, glass and shaped polymeric solid (acrylonitrile-butadiene-styrene copolymer). The conditions of irradiation employed are as follows:

| | |
|---|---|
| Potential | 275 KV. |
| Current | 30 ma. |
| Distance, emitter from workpiece | 10 in. |
| Atmosphere | nitrogen |
| Dose | 10–15 Mrad. |

EXAMPLE 2

The procedure of Example 1 is repeated with the difference that an equimolar mixture of methyl methacrylate and styrene are used in lieu of the methyl methacrylate monomer in the paint.

EXAMPLE 3

The procedure of Example 1 is repeated with the difference that a monomer mixture consisting of 50 mole percent methyl methacrylate, 20 mole percent ethyl acrylate, 10 mole percent butyl methacrylate and 10 mole percent 2-ethyl hexyl acrylate are substituted for the methyl methacrylate monomer in the paint.

EXAMPLE 4

The procedure of Example 1 is repeated with the difference that a monomer mixture consisting of 30 mole percent methyl methacrylate, 20 mole percent alpha methyl styrene, 10 mole percent vinyl toluene, 10 mole percent butyl acrylate, 10 mole percent divinyl benzene and 20 mole percent 1,3-butylene dimethacrylate.

EXAMPLE 5

The procedure of Example 1 is repeated except for the difference that the electron beam has an average energy of about 250,000 electron volts and the atmosphere for irradiation is helium.

EXAMPLE 6

The procedure of Example 1 is repeated except for the difference that the electron beam has average energy of about 325,000 electron volts and the atmosphere for irradiation is a major amount of nitrogen and a minor amount of carbon dioxide.

EXAMPLE 7

The procedure of Example 1 is repeated except for the difference that the rubber particles are formed from about 60 mole percent butyl acrylate, about 10 mole percent 1,3-butylene diacrylate, and 30 mole percent glycidyl methacrylate.

EXAMPLE 8

The procedure of Example 1 is repeated except for the difference that the rubber particles are formed from about 65 mole percent ethyl acrylate, about 15 mole percent 1,3-butylene dimethacrylate, and about 20 mole percent glycidyl methacrylate.

EXAMPLE 9

The procedure of Example 1 is repeated except for the difference that the rubber particles are formed from about 70 mole percent 2-ethyl hexyl acrylate, 10 mole percent 1,3-butylene dimethacrylate, and 20 mole percent glycidyl acrylate.

EXAMPLE 10

The procedure of Example 1 is repeated except for the difference that the rubber particles are formed from about 80 mole percent butyl acrylate, about 10 mole percent divinyl benzene, and about 10 mole percent glycidyl methacrylate.

EXAMPLE 11

The procedure of Example 1 is repeated except for the difference that the rubber particles are formed from about 80 mole percent butyl acrylate, about 15 mole percent 1,1,1-trimethylolethane trimethacrylate, and about 5 mole percent glycidyl methacrylate.

The determination of the concentration of the reactive epoxy groups on the shell of the graded-rubber particles is made by the method involving addition of tetraethylammonium bromide followed by titration with perchloric acid in acetic acid using crystal violet as indicator. This method is described by R. R. Jay in Analytical Chemistry, Vol. 36, page 667 (1964).

The alpha-beta olefinically unsaturated, acrylic rubber particles can also be used to form a paint with any alpha-beta olefinically unsaturated resin, e.g., the alpha-beta olefinically unsaturated resins disclosed in U.S. Pat. Nos. 3,437,512; 3,437,513; 3,437,514; 3,509,234; and 3,528,844. Another unsaturated resin that can be used in these paints can be prepared by preparing a carboxy-functional particle of elastomeric, crosslinked acrylic polymer by incorporating acrylic acid or methacrylic acid (or other olefinically unsaturated monocarboxylic acid) with the monoacrylate and the difunctional or trifunctional crosslinking agent and then reacting the resultant carboxy-functional particles with a monohydroxy alkyl acrylate. The monohydroxy alkyl acrylate can be prepared by reacting acrylic or methacrylic acid with diol, i.e., a monomeric glycol such as ethylene glycol, propylene glycol, neopentyl glycol, etc., or a polymeric glycol such as polyethylene glycol or propylene glycol.

The term "acrylate" and "acrylates," when used herein without a modifier distinguishing between esters of acrylic acid and methacrylic acid, shall be understood to include both. This, of course, does not apply to a naming of a specific compound.

It will be understood by those skilled in the art that modifications can be made within the foregoing examples in the scope of this invention as hereinbefore described and hereinafter claimed.

We claim:

1. An article of manufacture comprising in combination a substrate and a coating thereon comprising the polymerization product of a film-forming dispersion which on a pigment and particulate filler-free basis consists essentially of about 30 to about 90 weight percent vinyl monomers at least a major proportion of which are selected from esters of acrylic or methacrylic acid and a $C_1$–$C_8$ monohydric alcohol and $C_8$–$C_9$ monovinyl hydrocarbons, and about 10 to about 70 weight percent of alpha-beta olefinically unsaturated, elastomeric, crosslinked acrylic polymer, said particles consisting essentially of
   1. about 80 to about 98 mole percent of a monoacrylate component which consists essentially of about 65 to about 98 mole percent of a monoester of acrylic acid and a $C_2$–$C_8$ monohydric alcohol and about 2 to about 35 mole percent of an epoxy acrylate, and
   2. about 2 to about 20 mole percent of divinyl benzene, a diester of acrylic or methacrylic acid and a $C_2$–$C_6$ dihydric alcohol or a triester of acrylic acid or methacrylic acid and a $C_2$–$C_6$ trihydric alcohol, and being provided with alpha-beta olefinic unsaturation by reacting at least a major portion of the resultant epoxy groups with an alpha-beta olefinically unsaturated monocarboxylic acid.

2. An article of manufacture in accordance with claim 1 wherein said epoxy acrylate is glycidyl acrylate.

3. An article of manufacture in accordance with claim 1 wherein said epoxy acrylate is glycidyl methacrylate.

4. An article of manufacture in accordance with claim 1 wherein said alpha-beta olefinically unsaturated monocarboxylic acid is selected from acrylic acid and methacrylic acid.

5. A radiation-curable paint which on a pigment and particulate filler-free basis comprises a film-forming dispersion of about 30 to about 90 weight percent vinyl monomers at least a major proportion of which are selected from esters of acrylic or methacrylic acid and a $C_1$–$C_8$ monohydric alcohol and $C_8$–$C_9$ monovinyl hydrocarbons, and about 10 to about 70 weight percent of alpha-beta olefinically unsaturated, elastomeric particles of crosslinked acrylic polymer, said particles of crosslinked acrylic polymer consisting essentially of
  1. about 80 to about 98 mole percent of a monoacrylate component which consists essentially of about 65 to about 98 mole percent of a monoester of acrylic acid and a $C_2$–$C_8$ monohydric alcohol and about 2 to about 35 mole percent of an epoxy acrylate, and
  2. about 2 to about 20 mole percent of divinyl benzene, a diester of acrylic or methacrylic acid and a $C_2$–$C_6$ dihydric alcohol or a triester of acrylic acid or methacrylic acid and a $C_2$–$C_6$ trihydric alcohol, and being provided with alpha-beta olefinic unsaturation by reacting at least a major portion of the resultant epoxy groups with an alpha-beta olefinically unsaturated monocarboxylic acid.

6. A radiation-curable paint in accordance with claim 5 wherein said epoxy acrylate is glycidyl acrylate.

7. A radiation-curable paint in accordance with claim 5 wherein said epoxy acrylate is glycidyl methacrylate.

8. A radiation-curable paint in accordance with claim 5 wherein said alpha-beta olefinically unsaturated monocarboxylic acid is selected from acrylic acid and methacrylic acid.

9. In a method for painting a substrate wherein a film-forming solution is applied as a paint film to a surface of said substrate and crosslinked thereon by exposing the coated surface to ionizing radiation, the improvement wherein said film-forming solution, exclusive of nonpolymerizable solvents, pigments and particulate filler, consists essentially of about 30 to about 90 weight percent vinyl monomers at least a major proportion of which are selected from esters of acrylic or methacrylic acid and a $C_1$–$C_8$ monohydric alcohol and $C_8$–$C_9$ monovinyl hydrocarbons, and about 10 to about 70 weight percent of alpha-beta olefinically unsaturated, elastomeric particles of crosslinked acrylic polymer, said particles of crosslinked acrylic polymer consisting essentially of
  1. about 80 to about 98 mole percent of a monoacrylate component which consists essentially of about 65 to about 98 mole percent of a monoester of acrylic acid and a $C_2$–$C_8$ monohydric alcohol and about 2 to about 35 mole percent of an epoxy acrylate, and
  2. about 2 to about 20 mole percent of divinyl benzene, a diester of acrylic or methacrylic acid and a $C_2$–$C_6$ dihydric alcohol or a triester of acrylic acid or methacrylic acid and a $C_2$–$C_6$ trihydric alcohol, and being provided with alpha-beta olefinic unsaturation by reacting at least a major portion of the resultant epoxy groups with an alpha-beta olefinically unsaturated monocarboxylic acid.

10. A method in accordance with claim 9 wherein said epoxy acrylate is glycidyl acrylate.

11. A method in accordance with claim 9 wherein said epoxy acrylate is glycidyl methacrylate.

12. A method in accordance with claim 9 wherein said alpha-beta olefinically unsaturated monocarboxylic acid is selected from acrylic acid and methacrylic acid.

* * * * *